(12) United States Patent
MacSwan

(10) Patent No.: US 6,595,349 B2
(45) Date of Patent: Jul. 22, 2003

(54) ARTICLE TRANSFERRING DEVICE

(75) Inventor: John MacSwan, Wokingham (GB)

(73) Assignee: Hazmac (Handling) Limited (GB)

( * ) Notice: Subject to any disclaimer, the term of this patent is extended or adjusted under 35 U.S.C. 154(b) by 0 days.

(21) Appl. No.: 09/938,195

(22) Filed: Aug. 23, 2001

(65) Prior Publication Data

US 2002/0046921 A1 Apr. 25, 2002

(30) Foreign Application Priority Data

Aug. 24, 2000 (GB) ................................. 0020950

(51) Int. Cl.⁷ .................. B65G 15/24; B65G 17/26; B65G 37/00; B65G 47/34; B65G 47/10
(52) U.S. Cl. ................. 198/607; 198/370.09; 198/570; 198/597
(58) Field of Search ............... 198/370.09, 570, 198/597, 607, 610

(56) References Cited

U.S. PATENT DOCUMENTS

| 3,104,004 | A | | 9/1963 | Poel et al. |
|---|---|---|---|---|
| 3,782,527 | A | | 1/1974 | Petershack |
| 4,962,841 | A | * | 10/1990 | Kloosterhouse ........ 198/370.09 |
| 5,609,236 | A | * | 3/1997 | Neukam ................... 198/370.1 |
| 5,743,375 | A | | 4/1998 | Shyr et al. |
| 5,868,238 | A | * | 2/1999 | Bonnet ................... 198/370.09 |
| 6,343,685 | B1 | * | 2/2002 | Hofer ..................... 198/370.09 |

FOREIGN PATENT DOCUMENTS

DE  26 53 039 A1  5/1978

* cited by examiner

Primary Examiner—Christopher P. Ellis
Assistant Examiner—Gene O. Crawford
(74) Attorney, Agent, or Firm—Craig A. Fieschko, Esq.; DeWitt Ross & Stevens S.C.

(57) ABSTRACT

A mechanism for diverting articles from a first conveying path to a second conveying path comprises a drive chain arrangement comprising chain loops having projecting members over part of their periphery, so that as loops rotate an article is raised by the projecting members and conveyed in the direction of the second path. The projecting members comprise rollers arranged between two chains. The rollers may be arranged to roll on respective guide rails so that an article is conveyed into the second conveying path in an accelerated manner.

18 Claims, 3 Drawing Sheets

ARTICLE TRANSFERRING DEVICE

FIELD OF THE INVENTION

The present invention relates to an article transferring device and, in particular, to a mechanism for diverting pallets moving on a first conveying mechanism in a first direction to a second conveying mechanism in a second direction.

BACKGROUND OF THE INVENTION

In existing conveying systems, where two conveyors intersect, essentially both conveyor mechanisms are duplicated in the region of intersection, e.g. rollers and axles conveying in the first direction and their associated drive mechanisms and rollers and axles conveying in the second direction and also their associated drive mechanisms. This leads to a complicated construction in this region which is expensive to produce and difficult to maintain because the space is crowded. The problem is increased where it is desired to provide means for lifting one conveyor mechanism relative to the other so as to select which mechanism is to convey articles away from the intersection.

SUMMARY OF THE INVENTION

The invention involves an article transferring device which is intended to at least partially solve the aforementioned problems. To give the reader a basic understanding of some of the advantageous features of the invention, following is a brief summary of preferred versions of the article transferring device. As this is merely a summary, it should be understood that more details regarding the preferred versions may be found in the Detailed Description set forth elsewhere in this document. The claims set forth at the end of this document then define the various versions of the invention in which exclusive rights are secured.

According to a first aspect of the present invention, there is provided an article transferring mechanism for diverting articles travelling along a first conveying path to a second conveying path, said paths meeting at an intersection and said mechanism being arranged below said intersection and comprising conveying means defining upper surface regions arranged to move transversely of said first conveying path, wherein said transverse movement automatically raises said regions to engage an article at said intersection and to move said article in the direction of said second conveying path.

According to a second aspect of the present invention, there is provided an article transferring mechanism for diverting articles travelling along a first conveying path to a second conveying path, said paths meeting at an intersection and said mechanism being arranged below said intersection, wherein said mechanism comprises rotating means having an asymmetrical periphery whereby, in a first rotational disposition of said rotating means, it does not operatively engage said article at said intersection and, in a second rotational disposition of said rotating means, it operatively engages said article.

Further advantages, features, and objects of the invention will be apparent from the following detailed description of the invention in conjunction with the associated drawings

BRIEF DESCRIPTION OF THE DRAWINGS

Exemplary embodiments of the present invention will now be described with reference to the accompanying drawings in which.

DETAILED DESCRIPTION OF PREFERRED EMBODIMENTS OF THE INVENTION

Basically the present invention provides an article transferring mechanism for diverting articles traveling along a first conveying path to a second conveying path, the mechanism being arranged below an intersection of the paths and comprising means defining upper surface regions arranged to move transversely of the first conveying path, said transverse movement automatically raising said regions to engage an article at the intersection and to move it in the direction of the second conveying path.

Preferably said conveying means comprises one or more drive web members having members projecting from part of the length thereof and defining said upper surface regions.

The invention also provides an article transferring mechanism for diverting articles traveling along a first conveying path to a second conveying path, the mechanism being arranged below an intersection of the paths and comprising rotating means having an asymmetrical periphery whereby, in one rotational disposition of said rotating means, it does not operatively engage an article at the intersection and, in another rotational disposition of said rotating means in which a different section of said periphery is uppermost, it operatively engages an article.

Preferably said rotating means comprises one or more web members in the form of continuous loops having members projecting from a part of the length of their periphery.

In preferred arrangements said projecting members project from 30 to 70% of the length of the web members. This ensures that, in at least one disposition of the web members, no contact is made with an article located thereabove and, in at least one other disposition of the web members, contact is made with a substantial part of such an article.

The projecting members are preferably rollers. A guide, e.g. in the form of a rail, may be located beneath the rollers so that the rollers roll therealong. This has the advantage of moving an article along the second conveying path in an accelerated manner.

The web members are preferably in the form of chains, preferably two parallel chains with the projecting members, e.g. the rollers, located therebetween. This forms a particularly stable arrangement, especially when the rollers roll on the guide rail.

Figure 1:
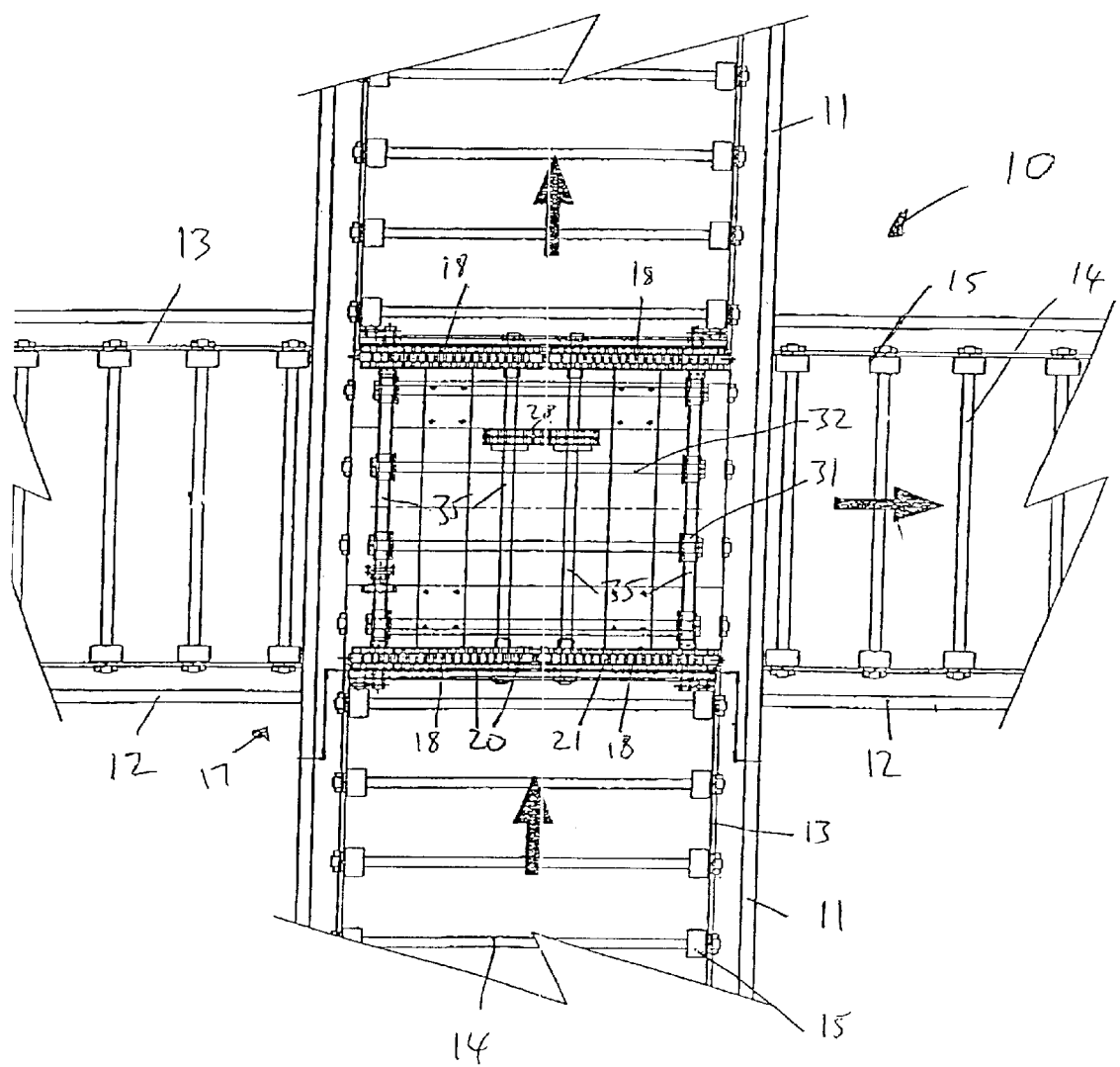
FIG. 1 shows a top view of a conveying system incorporating an article transferring device in accordance with a first embodiment of the invention.

With reference to FIG. 1, a conveying system 10 is composed of two mutually-perpendicular conveyors 11 and 12 with rails 13. Conveyors 11 and 12 are essentially continuously running. Axles 14 carrying wheels or rollers 15 at their ends are rotatably-mounted at equally-spaced fixed locations along the rails 13. Each conveyor is driven by a means of a motor (not shown) connected by gearing (not shown) to wheels 15. The pallets 50 traveling along each conveyor are propelled smoothly along by riding on the wheels 15.

In the region of the intersection 17 of the conveyors 11, 12, conveyor 11 comprises rollers 31 connected by axles 32 and arranged to be driven by the same motor as the rest of conveyor 11. The rollers 31 are slightly closer together than wheels 15 and are at the same level.

A drive system comprising a number of chain drive mechanisms 18, 28 is also provided in the intersection region 17. The drive system extends over substantially the entire width of both conveyors 11, 12. Each mechanism 18 comprises two drive chains 20 running on hardened guides 37 and held at a spacing apart. The chains pass around sprockets 19 to form endless loops. The sprockets 19 at the top and bottom of the intersection region 17 as shown in FIG. 1 are interconnected by drive shafts 35, and the adjacent drive shafts 35 of the left and right drive mechanisms 18 in FIG. 1 are interconnected by a drive mechanism 28 which comprises two shorter drive chains. All the drive mechanisms 18 are connected via shafts 35 and mechanism 28 to a common drive motor (not shown).

Figure 2:
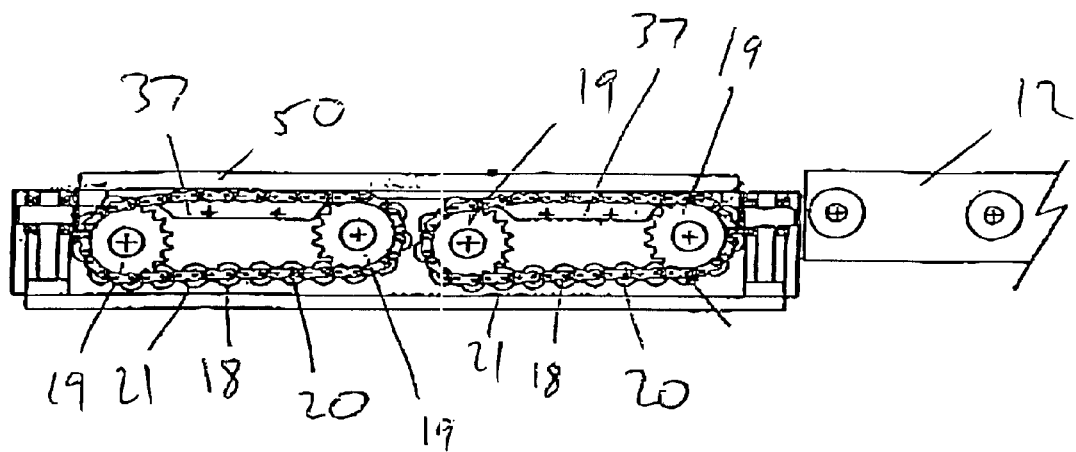
FIG. 2 shows an enlarged side section view of the device of FIG. 1.

The top runs of the drive chains 20 are arranged to extend just below the level of rollers 31, as shown in FIG. 2. Also as shown in FIG. 2 center free rollers 21 are provided between the chains 20 of each mechanism 18 over about 60% of the length of the chains to form a power and free chain assembly in a so-called "triplex" arrangement. When the rollers 21 are in the top run of the drive chains 20, see FIG. 3, their top surfaces project above the level of rollers 31.

Figure 3:
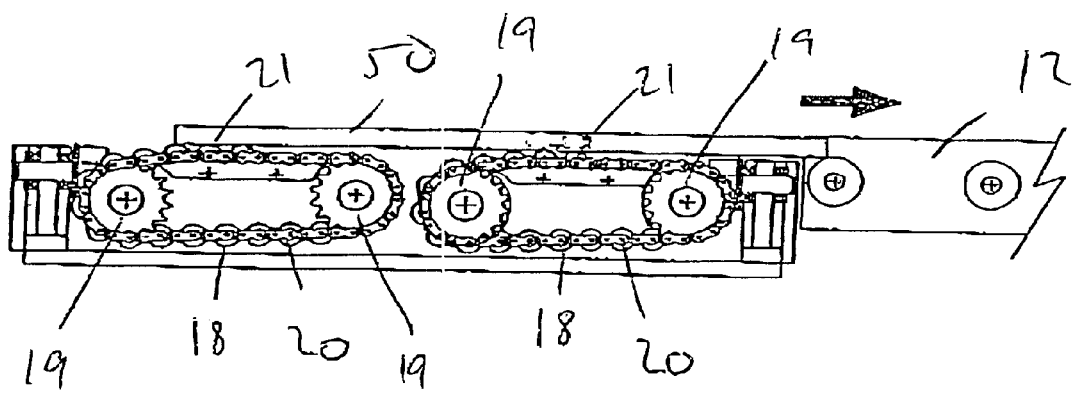
FIG. 3 shows a view corresponding to FIG. 2 during the transfer process.

In use, pallets 50 on conveyor 11 can be transported on wheels 15 and rollers 31 from the bottom to the top of FIG. 1 as indicated by the arrows. If, however, it is desired to divert an incoming pallet 50 to the right hand part of the conveyor 12, the pallet is stopped by a separate conventional stop mechanism (not shown) when the pallet reaches the intersection region 17. The motor for the drive mechanisms 18 is then actuated so that drive chains 20 move from the position shown in FIG. 2 so that rollers 21 are brought underneath pallet 50 and are moved from left to right. This has the effect of lifting pallet 50 and carrying it to conveyor 12 as shown in FIG. 3. Once part of the pallet 50 is on outgoing conveyor 12, the wheels 15 of the conveyor 12 pull the pallet 50 off the intersection 17. After the chains 20 have completed a single rotation, pallet 50 has been completely transferred to conveyor 12 and the chains return to the position shown in FIG. 2.

An advantage of the above-described system is that it is compact. In particular the intersection region 17 where the pallets are to be diverted is uncluttered. The system is energy-efficient since the motor for mechanisms 18 is only actuated during a diverting operation. The system also allows pallets to be diverted quickly which can be essential to a large factory or assembly line. The mechanism of the present invention has less moving parts, which makes it safer to operate and has less chance of malfunction due to its robust design.

Various modifications may be made to the above-described arrangement. For example, each of the mechanisms 18 as shown in FIG. 2 may be replaced by a single longer mechanism extending over substantially the entire width of the conveyor 11. Alternatively there may be three or more drive mechanisms 18 extending over the width of the conveyor. One or more additional mechanisms or sets of mechanisms 18 may be provided centrally between the top mechanisms and bottom mechanisms as shown in FIG. 1. The rollers 21 may extend over 30 to 70% of the length of each drive chain.

For each mechanism 18, a single drive chain 20 with attached rollers 21 on one or both sides may be used instead of the triplex arrangement disclosed. Alternatively each mechanism 18 may comprise of three or more chains 20 with corresponding numbers of chain rollers 21. The rollers 21 may be replaced by projecting members of other cross-section such as square blocks, or by a continuous raised belt member. The chains 20 may also be replaced by other suitable web members such as belts.

For each mechanism 18, the chain(s) 20 and the rollers 21 may be replaced by a belt having a thin section and a thick section connected at both ends to form a continuous loop. When the thin sector is uppermost its upper surface is at or just below the level of rollers 31; when the thick section is uppermost, its upper surface is higher than the level of rollers 31, thus lifting and moving a pallet 50 at the intersection 17.

Mechanism 18 may be replaced by suitably adapted wheels or rollers with circumferences which have a normal circular portion and an enlarged portion in the manner of a cam member. Upon rotation, when the enlarged portion comes under a pallet at the intersection 17, it raises the pallet and moves it in the direction of conveyor 12.

The two conveyors 11, 12 may meet at different angles and/or may be on slightly different levels. This allows the conveyors 11 and 12 and the article transferring device 18 to be employed in any situation and be set up to operate within a confined space and used to turn virtually any angle.

The conveying system 10 may be used to convey articles other than pallets, in which case the size, shape and position of the conveying elements are changed as necessary.

Figure 4:
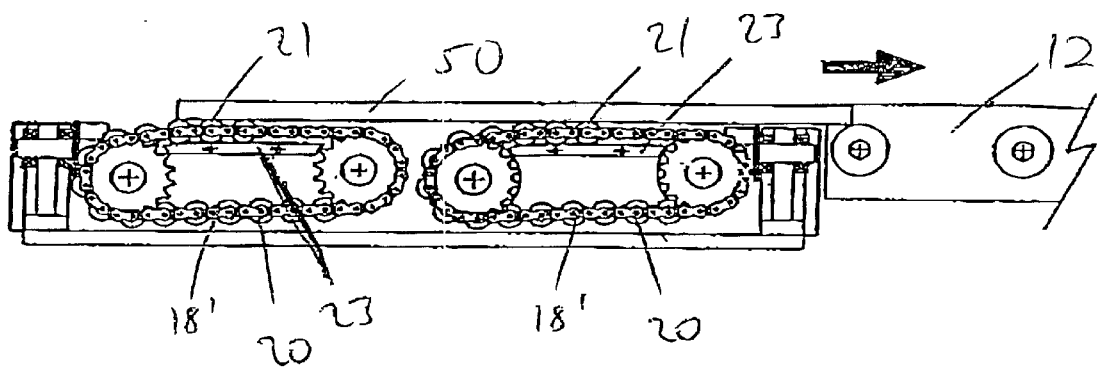
FIG. 4 shows a modification of the system of FIGS. 2 and 3.

In a further modification, FIG. 4 the drive mechanisms 18' each contain a hardened steel guide 23 located between and slightly below the top runs of the drive chains 20. The position of guide 23 is such that rollers 21 roll thereon as they are moved from right to left. Thus guide 23 constitutes a so-called accelerator rail in that a pallet 50 is not only raised relative to rollers 31 but is conveyed to the right at twice the speed of the drive chains 20.

Figure 5:
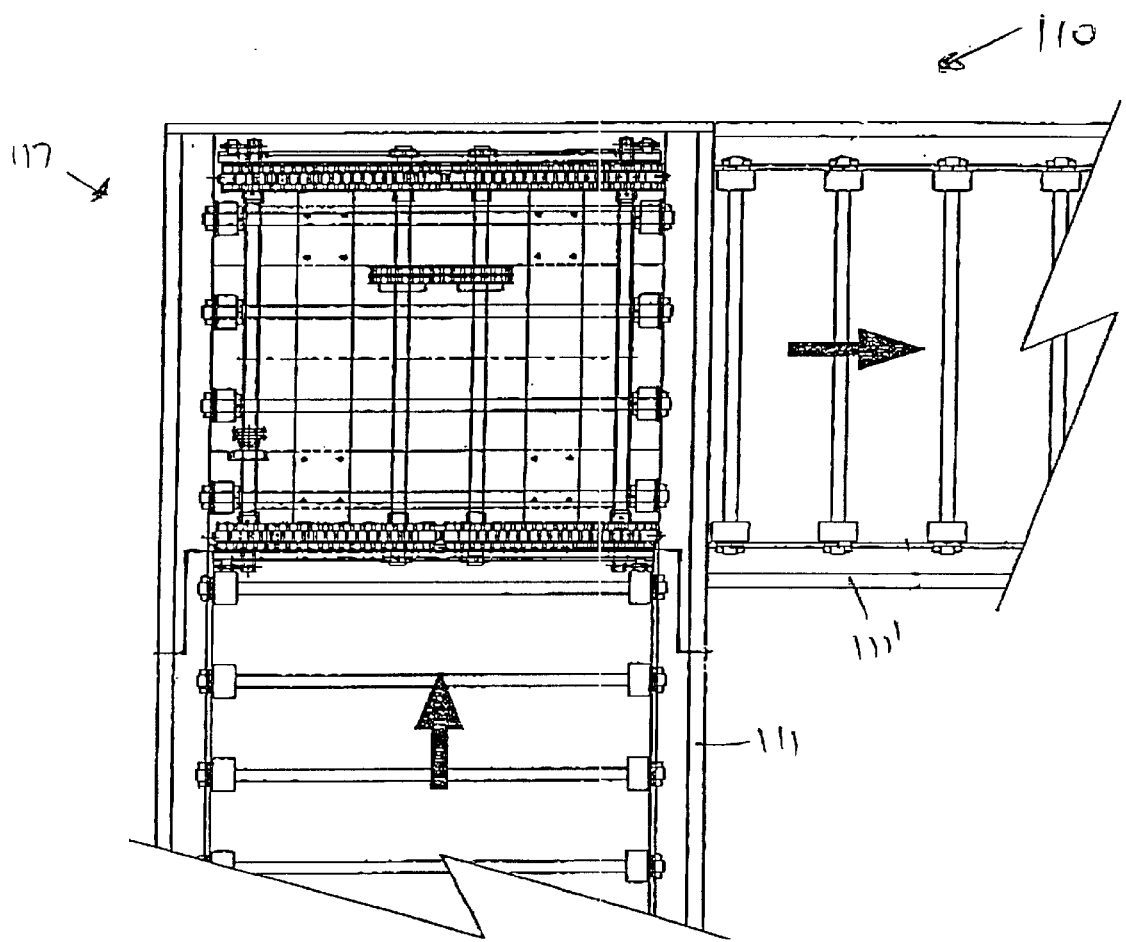
FIG. 5 shows a second embodiment of the invention.

FIG. 5 shows a second embodiment of the invention comprising a conveying system 110 comprising a single conveyor with mutually perpendicular paths 111, 111'. At the junction 117 of the paths there is provided an article transferring device as described in connection with FIGS. 1 to 3 or FIG. 4. Junction 117 can be a loading and/or unloading point of the conveying system, or it may be simply a location where the conveying path is constrained to turn a corner.

Since the foregoing versions of the invention are susceptible to various other modifications, changes and adaptations, it is noted that the invention is not intended to be limited to the preferred versions described above, but rather is intended to be limited only by the claims set out below. Thus, the invention encompasses all alternate embodiments that fall literally or equivalently within the scope of these claims.

What is claimed is:

1. An article transferring mechanism for diverting articles travelling along a first conveying path to a second conveying path, said paths meeting at an intersection and said mechanism being arranged below said intersection and comprising conveying means defining upper surface regions arranged to move transversely of said first conveying path, wherein:

a. said conveying means comprises one or more drive web members having projecting members projecting from part of the length thereof and defining said upper surface regions, said projecting members including rollers;

b. said transverse movement automatically raises said regions to engage an article at said intersection and to move said article in the direction of said second conveying path.

2. A mechanism according to claim 1, wherein said projecting members project from 30%–70% of the length of said web members.

3. A mechanism according to claim 1, wherein a guide is located beneath said rollers, said rollers being arranged to roll on said guide.

4. A mechanism according to claim 3, wherein said web members comprise two generally parallel chains and said guide is a guide rail, said guide rail being arranged between and below said generally parallel chains.

5. A mechanism according to claim 1, wherein said web members comprise chains.

6. A mechanism according to claim 5, wherein said web members comprise two generally parallel chains and said projecting members are located between said generally parallel chains.

7. An article transferring mechanism for diverting articles travelling along a first conveying path to a second conveying path, said paths meeting at an intersection and said mechanism being arranged below said intersection, wherein said mechanism comprises rotating means having an asymmetrical periphery such that (a) in a first rotational disposition of said rotating means, said rotating means does not operatively engage an article at said intersection, and (b) in a second rotational disposition of said rotating means, said rotating means operatively engages an article, and wherein said rotating means comprises one or more web members in the form of continuous loops having projecting members projecting from a part of the length of their periphery, said projecting members comprising rollers.

8. A mechanism according to claim 7, wherein said projecting members project from 30%–70% of the length of said web members.

9. A mechanism according to claim 7, wherein a guide is located beneath said rollers, said rollers being arranged to roll on said guide.

10. A mechanism according to claim 9, wherein said web members comprise two generally parallel chains and said guide is a guide rail, said guide rail being arranged between and below said generally parallel chains.

11. A mechanism according to claim 7, wherein said web members comprise chains.

12. A mechanism according to claim 11, wherein said web members comprise two generally parallel chains and said projecting members are located between said generally parallel chains.

13. An article transferring mechanism for diverting articles travelling along a first conveying path to a second conveying path at an intersection, the article transferring mechanism being situated below the intersection and comprising:

a. one or more drive members, each drive member being formed of a continuous loop having an asymmetrical periphery; and b. rollers projecting from the drive members, the rollers being arranged to move transversely of said first conveying path, and wherein such transverse movement automatically raises the rollers to engage an article at the intersection and to move the article in the direction of the second conveying path.

14. The article transferring mechanism of claim 13 wherein the rollers project from 30%–70% of the length of the drive members.

15. The article transferring mechanism of claim 13 wherein a guide is located beneath the rollers, and wherein the rollers are arranged to roll on the guide.

16. The article transferring mechanism of claim 13 wherein the drive members include chains.

17. The article transferring mechanism of claim 13 wherein the drive members include two generally parallel chains, and wherein the rollers are located between the two generally parallel chains.

18. The article transferring mechanism of claim 13 wherein the drive members include two generally parallel chains, and wherein a guide rail is located beneath the rollers and between and below the two generally parallel chains.

* * * * *